(12) United States Patent
Sun

(10) Patent No.: US 8,423,472 B2
(45) Date of Patent: Apr. 16, 2013

(54) METHOD OF TIME CHARGING TO DHCP ONLINE USERS IN A BROADBAND ACCESS SERVER

(75) Inventor: Peng Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 1354 days.

(21) Appl. No.: 10/563,496

(22) PCT Filed: Jun. 22, 2004

(86) PCT No.: PCT/CN2004/000669
§ 371 (c)(1),
(2), (4) Date: Jan. 3, 2006

(87) PCT Pub. No.: WO2005/004388
PCT Pub. Date: Jan. 13, 2005

(65) Prior Publication Data
US 2006/0155994 A1    Jul. 13, 2006

(30) Foreign Application Priority Data
Jul. 1, 2003  (CN) .................................. 03 1 39699

(51) Int. Cl.
G06F 21/00     (2006.01)
G06F 15/173    (2006.01)

(52) U.S. Cl.
USPC .............. 705/52; 709/223; 709/224; 709/225

(58) Field of Classification Search .................... 705/52; 709/223–225
See application file for complete search history.

(56) References Cited

U.S. PATENT DOCUMENTS

| 6,035,281 | A  | * | 3/2000  | Crosskey et al. | 705/14.69 |
| 6,298,383 | B1 | * | 10/2001 | Gutman et al. | 709/229 |
| 6,427,170 | B1 | * | 7/2002  | Sitaraman et al. | 709/226 |
| 6,446,200 | B1 | * | 9/2002  | Ball et al. | 713/1 |
| 6,775,267 | B1 | * | 8/2004  | Kung et al. | 370/352 |
| 6,807,171 | B1 | * | 10/2004 | Chow et al. | 370/389 |
| 2003/0140151 | A1 | * | 7/2003 | Daenen et al. | 709/229 |
| 2003/0147421 | A1 | * | 8/2003 | Gutknecht et al. | 370/468 |
| 2007/0159971 | A1 | * | 7/2007 | Zhang et al. | 370/230 |

FOREIGN PATENT DOCUMENTS
WO           9913427    A2      3/1999

* cited by examiner

Primary Examiner — Steven Kim
(74) Attorney, Agent, or Firm — Morris Manning & Martin LLP; Tim Tingkang Xia, Esq.

(57) ABSTRACT

A method of calculating broadband access server DHCP user's on-line time, includes these steps: (a) setting the inner time, outer time and traffic threshold for said access server calculating user's data traffic, and the inner time is shorter than the outer time; (b) user accesses the said access server, after authenticated successfully, the access server notifies starting to charge the user's online time; (c) according to each user, said access server establishes a ring list to record data traffic; (d) said access server sets the number of ring list elements as multiple of said outer time to said inner time; (e) said access server inspects the said user's data traffic according to inner time, fills it in content indicated by top element index of ring list, until current data traffic inspected and value recorded by top index are not more than said traffic threshold. The advantage of the invention is that timing is precise and error is small.

3 Claims, 4 Drawing Sheets

METHOD OF TIME CHARGING TO DHCP ONLINE USERS IN A BROADBAND ACCESS SERVER

FIELD OF THE INVENTION

The present invention generally relates to a method of time charging for an online user in a server in communication technology, and especially relates to an improvement of a method time charging for a DHCP online user in a broadband access server.

BACKGROUND OF THE INVENTION

With popularization of data services, there is little requirement of network knowledge for internet users. An access mode of DHCP+WEB+RADIUS, because of its user-friendly interface and no requirement of sophisticated network knowledge for clients, is becoming a very popular network mode provided by telecom service providers.

DHCP, an abbreviation of Dynamic Host Configuration Protocol, allows a server to dynamically assign an IP address and relevant configuration information of the server to a client. For such a DHCP, each client can obtain an IP address at start and occupy the IP address thereafter, thus a DHCP access mode uses mass address resources of telecom service providers. Furthermore, the DHCP access mode is unlike a narrowband access mode that can supply a human-machine interface with a perfect connection and disconnection mechanism. At present, no flat rate of fee charging based on client's online time is available in the market, and only a monthly flat rate is used for the clients. On one hand, it wastes a lot of communication resources. On the other hand, with concerns on service level and return on investment, service providers demand urgently technologies of accurate timing to realize the flat rate for DHCP users. When a DHCP user has been in an IDLE state for a period of time, that is, when the user's communication data flow has been lower than an assigned value for a period of time, the user might be considered to be offline, and time charging for the user should be stopped. In other words, it needs to detect a user's IDLE state. Once the user is detected in the IDLE state, the user's connection with the network should be disconnected, and meanwhile time charging of user online should be ceased. Therefore, login timing accuracy to DHCP users relies on timeliness and accuracy of detecting the IDLE state.

Conventional detection methods of the IDLE state are in such way that a timer is directly configured such that data flow of a user is detected periodically at each interval so as to decide whether an increment between the user's data flow and the last check point is less than a threshold (assigned value); if the increment is not greater than the threshold, the user is considered offline; otherwise, the user is considered online or downloading.

The conventional technology, however, has the following defects:

1. Due to inaccuracy of fee charging methods, a user in an IDLE state may be considered as in a normal online state.

For example, as shown in FIG. 1A, provided that a time interval for IDLE detection is about 5 minutes, a user has a great deal flow at the first minute, and the flow does not exceed a threshold, the user will be forced to login off at the tenth minute according to a conventional algorithm. Such detection error is certainly too large, and can also make a waste in communication resources. To solve the problem, the time interval of detection is usually reduced in conventional methods for IDLE state detection.

2. Due to fixed time intervals, the state of a user may wrongly be detected.

For example, as shown in FIG. 1B, if the user's flow is relatively large at the fourth and the sixth minute, but such a flow is not large enough to exceed the threshold, the user will be forced to logoff at the tenth minute. In fact, the user's flow at an interval of five minutes exceeds the threshold, and therefore the state of the user may wrongly be detected. To solve the problem, testing time is usually increased in conventional methods for IDLE state detection so as to reduce frequency of wrong detection. Thus it is difficult for conventional methods to achieve a desirable precision for time charging to DHCP users.

Therefore, a heretofore unaddressed need exists in the art to address the aforementioned deficiencies and inadequacies.

SUMMARY OF THE INVENTION

The technical problem solved in the present invention is to provide a method of time charging to DHCP users in a broadband access server, which reduces detection error, solves the problem in detecting IDLE state and satisfies the accuracy required.

In one aspect, the present invention provides a method of time charging to DHCP online users in a broadband access server, wherein the broadband access server detects data flow of an authenticated user by using an inner time interval that is shorter than an outer time interval and a flow threshold and establishing a circular linked list corresponding to the user, and decides whether the user is in an IDLE state; if not, the server records the present flow value in the circular link list and continually detects the data flow; otherwise the server determines the user to be in an IDLE state. By reducing the time unit for data flow detection, the detection error is reduced, the problem of detecting an IDLE state is solved, and the required precision is satisfied.

In one embodiment, the method comprises the following steps:
  a) setting an inner time, an outer time and a flow threshold for counting data flow of the users in the broadband access server, the inner time being shorter than the outer time;
  b) starting time charging to the users by instruction of the access server to the users sooner after the users access the access server and are authenticated successfully,
  c) establishing a circular link list to each user for recording data flow of the user in the access server;
  d) defining a number of elements in the circular link list as a multiple of the outer time to the inner time in the access server; and
  e) detecting the data flow of the user according to the inner time in the access server, and recording the data flow as a content of a head pointer of the circular link list in turn, until a difference between data flow newly detected and the content rerecorded in the head pointer is not more than the flow threshold.

The method is characterized in that, when the circular link list is not full, step e) further comprises the step of:
  e1) examining data flow newly detected and the content of the head pointer, when the difference between the data flow newly detected and the content of the head pointer exceeds the flow threshold, saving the data flow newly detected as the content of the head pointer, and, meanwhile, moving the head and tail pointers down a position.

The method is characterized in that, when the circular link list is full, step e) further comprises the step of:

e2) examining data flow newly detected and the content of the head pointer element, when the difference between the data flow newly detected and the content of the head pointer exceeds the flow threshold, saving the data flow newly detected as the content of the head pointer, and moving the head and tail pointers down a position.

The method is characterized in that the method further comprises the steps of:

f) deciding the user in an IDLE state in the access server when the difference between the data flow newly detected and the content recorded in the head pointer does not exceed the flow threshold; and g) stopping time charging to the user by instruction of the access server to the user.

The method is characterized in that the method further comprises the step of setting the user in an unauthenticated state in step f).

The method is characterized in that the method further comprises the step of setting a charging server for time charging to the online users in step b).

The method is characterized in that the time for the charging server to stop time charging is before an outer time corresponding to the inner time when the IDLE state is detected.

The method is characterized in that the inner time is about 30 seconds and/or the outer time is about 5 minutes.

In one embodiment of the present invention, the access server defines a circular link list corresponding to a login user, regarding each element in the circular link list, the content of the head pointer records data flow that is detected in turn and when the assigned threshold is exceeded, and the tail pointer points to next element, so that data flow of the user can be monitored dynamically. In such a way, the time precision in detection is based on the inner time, and therefore detection precision is enhanced and detection error is reduced.

The technical solution and its advantage effects of the present invention will be obvious through describing of the preferred embodiments of the present invention in details below in combination with drawings attached.

DETAILED DESCRIPTION OF THE INVENTION

Figure 1A:
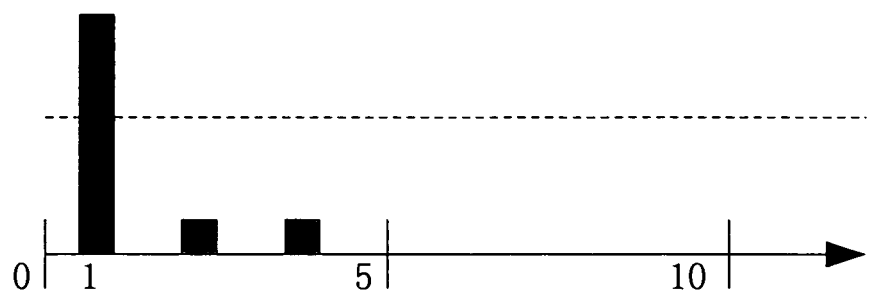
FIGS. 1A and 1B are schematic diagrams of data flow detection of a conventional method.
Figure 1B:
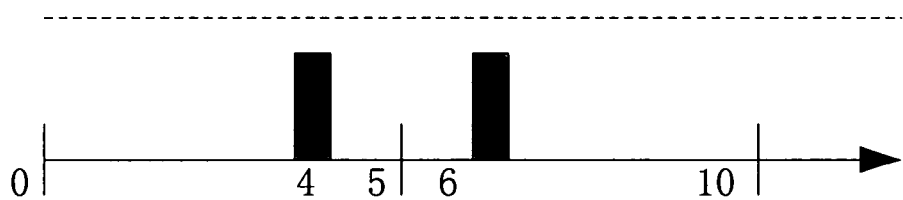
Figure 2:
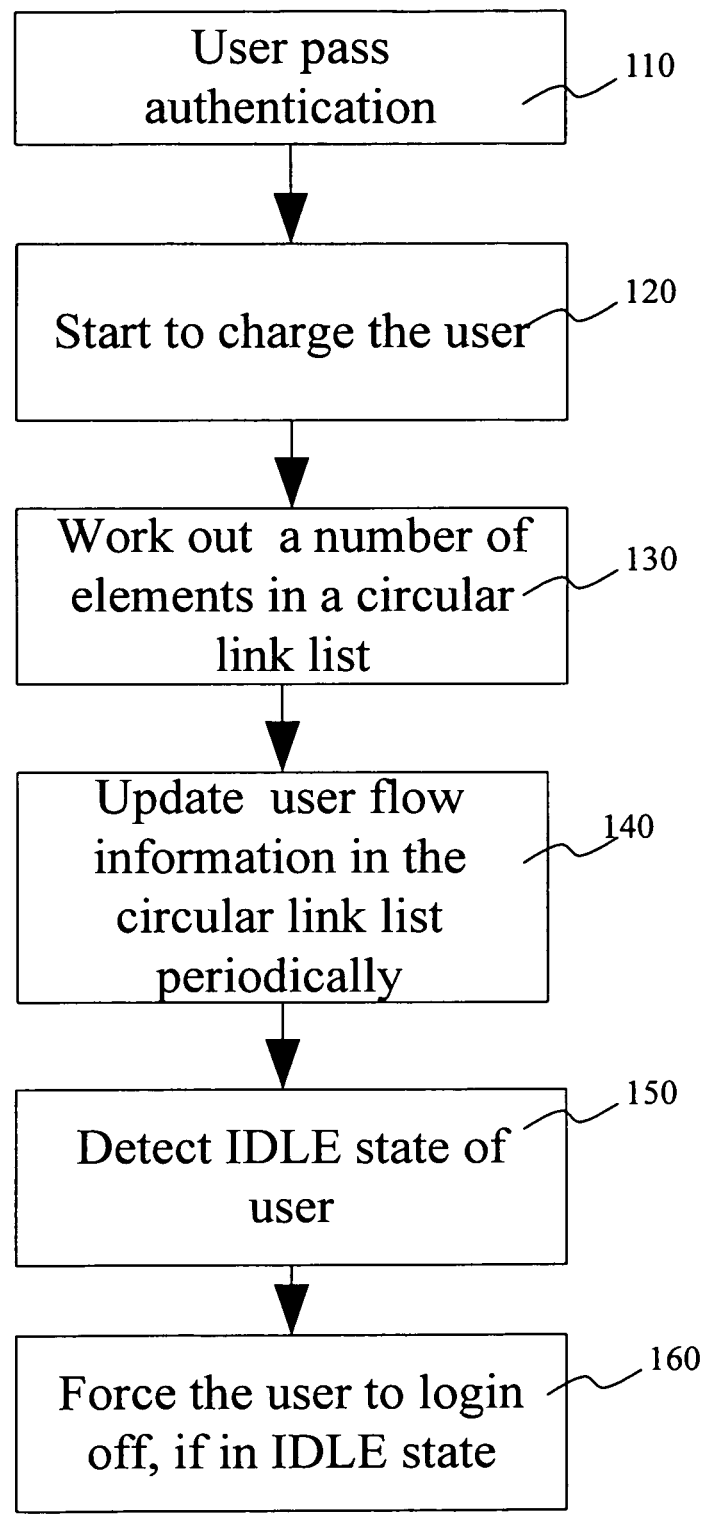
FIG. 2 shows a flow chart of a method of time charging to DHCP online users in broadband access server according to one embodiment of the present invention.

A method of time charging to DHCP online users in a broadband access server according to one embodiment of the present invention comprises the following steps:

Firstly, an outer time interval and an inner time interval are configured in a broadband access server for detecting an IDLE state, which corresponds to a logout state of a user. In general, the broadband access server always monitors user flow, where a unit of an interval (inner time interval) for monitoring the user flow in the broadband server is in seconds, and a unit of an interval (outer time interval) for detecting an IDLE state at outside of the broadband access server system is in minutes. According to one embodiment of the present invention, the inner time interval for monitoring the user flow must be smaller than the outer time interval for IDLE state detection outside. For example, an outer detection time may be set to be about 5 minutes, a threshold is about 10k, a time interval for detecting the user flow within the system, namely inner time interval, is about 30 seconds. Referring to FIG. 2, the time charging method for DHCP users is further described as below.

At step 110: a user automatically obtains an IP address by the DHCP, is authenticated successfully, and then accesses the Internet; and the broadband access server timely informs a charging server to start the online time charging to the user.

At step 120: the online time charging starts from the time when the user is authenticated successfully. In general, passing through authentication for the user indicates that the user starts to accept the service provided by the service provider.

At step 130: the broadband access server calculates a number of elements in a circular link list based on the inner time interval and the outer time interval configured. The number of elements equals to the ratio of the outer time interval to the inner time interval. For example, in one embodiment, the outer time interval is set to be about 5 minutes and the inner time interval is set to be about 0.5 minutes. Accordingly, the number of elements of the circular link list is equal to the ratio of the outer time interval to the inner time interval, 5 to 0.5, that is, about 10. The broadband access server then records the result calculated.

At step 140: the information on the user flow is timely updated.

At step 150: an IDLE state of the user is detected.

At step 160: the user in the IDLE state is forced to log out.

Figure 3:
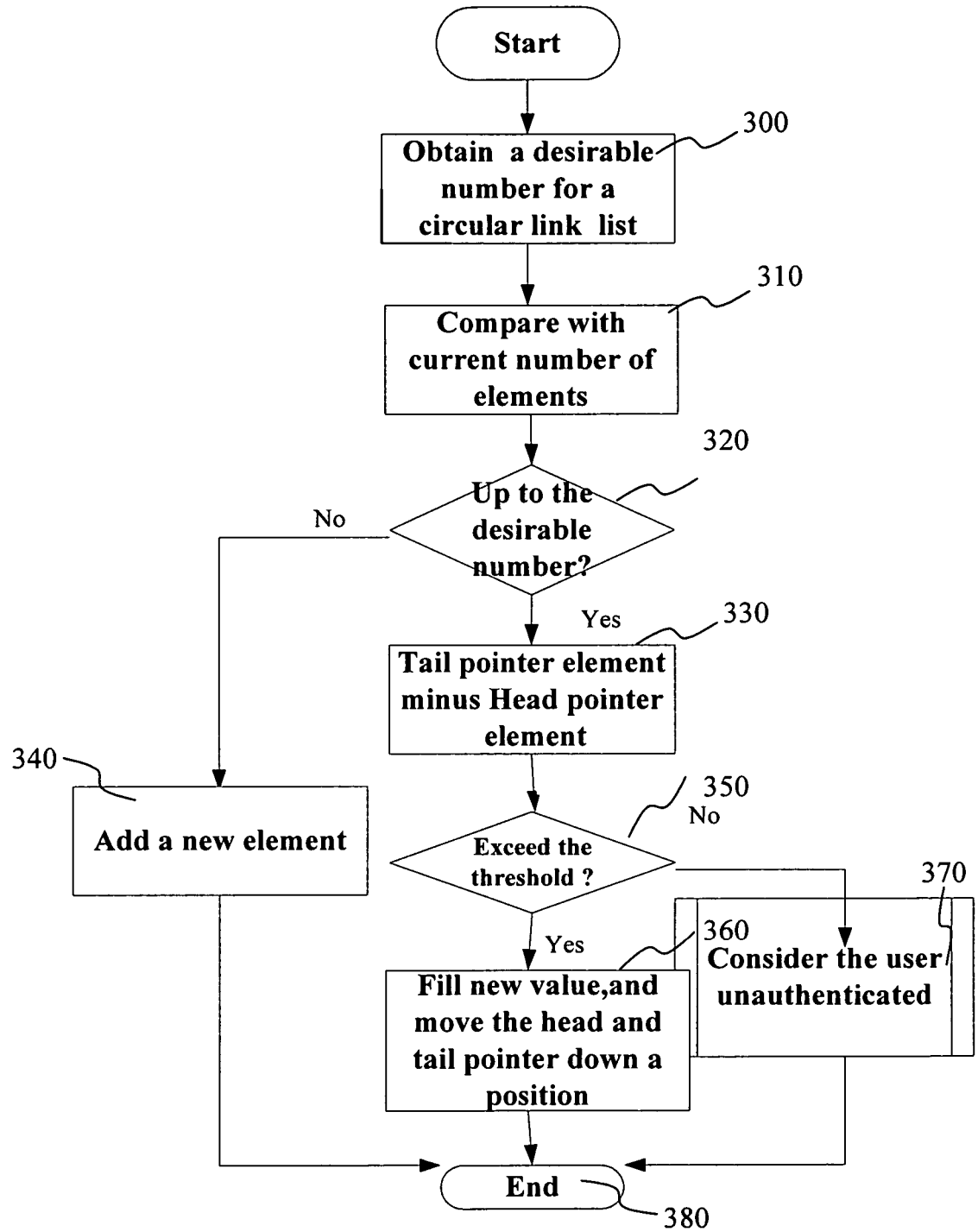
FIG. 3 is a flow chart of detection for each inner detection period in a method according to one embodiment of the present invention.

Referring to FIG. 3, the flow chart of detection for the circular link list is shown according to one embodiment of the present invention. The circular link list corresponds to an accessed and authenticated user. In a process of recording a corresponding user's data flow, a pointer is used to point a head pointer of the circular link list. The content of an element of the head pointer is corresponding to the value of flow before an IDLE detection interval, and the content of an element pointed by a tail pointer is the latest flow result detected.

The user's circular link list is not full when the user just passes the authentication. At first, whether the number of elements in the circular link list is up to 10 or not is checked. If the number of elements is not up to 10, an element is added at each interval of the inner time, the content of the head pointer is filled with data flow result reported, the element newly added is added to the tail of the circular link list, and the tail pointer points to the element new added. Particularly, each new data flow value is compared with the content of the head pointer in the circular link list, after compared, if the user is not in an IDLE state, such new data flow value is saved in the content of the head pointer. At the same time, the head and tail pointers move down one position, so as to ensure that the content of the element of the head pointer still is flow value before one IDLE detecting interval and the content of the element pointed by the tail pointer still is the latest data flow result detected.

If the circular link list is full (up to 10), new data flow value detected is compared with the value of the element of the head pointer; if the difference between the new data flow and the content of the element of the head pointer is greater than the assigned threshold, 10k for example, the new data flow value overwrites the value of the head pointer, and meanwhile, the head and tail pointers move down one position, so as to ensure that the value of the element of the head pointer still is the flow value before one IDLE detecting interval and the value of the element pointed by the tail pointer still is newly data flow result detected.

If the difference between the new data flow and the content of the element of the head pointer is not greater than the assigned threshold, 10k, the user is considered being offline; and then the broadband access server sets the user in unauthenticated state, that is, the user is forced to logout. Meanwhile, the broadband access server informs RADIUS Server of the user being offline and stopping time charging. The time when the user logs out is considered as the time before 5 minutes.

In the embodiment, as shown in FIGS. 2 and 3, the broadband access server starts to query the user's data flow. Referring back to FIG. 3, detection for the circular link list includes the following steps: at step 300, the number of elements in a corresponding circular link list is obtained by detecting the user's data flow. At step 310, the number of elements is compared with those in the current circular link list. Then at step 320, whether a desirable number of elements is achieved is determined. If not, the detection result is filled to the content of the head pointer and the tail pointer point is made to the new element, meanwhile, the head and tail pointers move down one position in the circular link list, and data flow is detected for a next inner time at step 340. If the number of elements in the circular link list is greater than the desirable number, the element of the tail pointer and the content of the head pointer are compared at step 330. Then whether the difference between the element of the tail pointer and the content of the head pointer is greater than the assigned threshold is determined at step 350. If the difference is greater than the assigned threshold, the head and tail pointers are moved down one position in the circular link list, and the new data flow is filled to the content of the head pointer at step 360. If the difference is not greater than the assigned threshold, the user is set to be in unauthenticated state and forced to offline by the broadband access server at step 370. Then the system is returned to its detection state at step 380.

Figure 4:
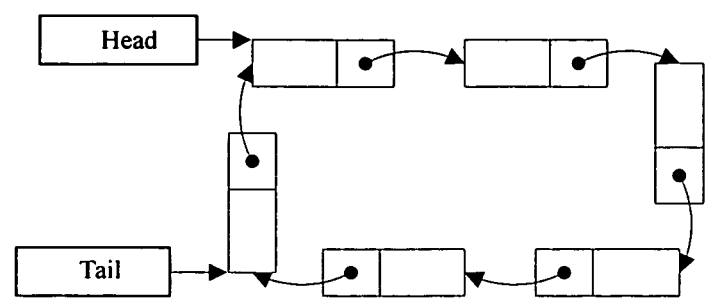
FIG. 4 is a schematic diagram of data structure in a method according to one embodiment of the present invention.

In one embodiment of the present invention, the detected results of the data flow of the user in the latest period of time are saved in turn, which corresponds to a queue of the user's flow data observing through a data window in which the width of the data window is width of the inner time interval for detecting flow assigned for the user. In the data window, multiple detecting results are saved, and the interval of each result is corresponding to the inner time interval for detecting flow in the system, as shown is FIG. 4.

According to the present invention, when the data flow of the user is queried once, the data window goes forward one position. While moving, the flow results at the two ends of the window are compared; if the difference between the flow results at the two ends of the window is not greater than the threshold, the user is considered in an IDLE state and forced to be offline; otherwise, new data detected is filled into the content of the head pointer.

In conventional algorithms for realizing IDLE detection, in general, the granularity of detection is an interval assigned for detecting, such as 5 minutes. However, according to the method (algorithm) of the present invention, the detection granularity is the inner time interval for querying user data flow in the broadband access server system, such as 30 seconds, so the detection is more accurate.

It should be noted that the inner time and the outer time in the method of the present invention could be assigned in different values. The specific value mentioned above is corresponding to one embodiment of the present invention, which should not be used to limit the scope of the present invention.

It should be noted that, persons skilled in the art should understand that, the technical solutions of the present invention can be modified or substituted, without departing from the spirit and scope of the present invention, and all the modification and substitution fall in the scope of claims in the present invention.

What is claimed is:

1. A method of recording online DHCP (Dynamic Host Configuration Protocol) usage duration of a user in a broadband access server, the method comprising the steps of:
   a) determining, by the broadband access server, an inner time interval, an outer time interval, and a flow threshold, wherein the inner time interval is less than the outer time interval;
   b) authenticating, by the broadband access server, the user and transmitting, by the broadband access server, start charging message to a charging server upon the authentication of the user;
   c) calculating, by the broadband access server, a number of elements of a circular link list by dividing the outer time interval by the inner time interval and creating, by the broadband access server, the circular link list with the calculated number of elements;
   e) monitoring, by the broadband access server, a data flow of the user and recording the monitored data flow in a current element of the circular link list at the inner time interval until all the elements in the circular link list are filled with the monitored data flow, wherein the circular link list is shifted at each intervals of the inner time interval such that last element of the circular link list is in position of the current element of the circular link list;
   f) at the inner time interval, detecting, by the broadband access server, a data flow of the user, shifting the circular link list such that the last element of the circular link list is in position of the current element of the circular link list, and obtaining the lastly recorded data flow from the current element of the circular link list;
   g) determining, by the broadband access server, whether the user is in the IDLE state by comparing the difference of the detected data flow and the obtained data flow from the current element of the circular link list with the flow threshold; and
   h) sending, by the broadband access server, stop charging message to the charging server and logging off the user based on the determination of IDLE state.

2. A method of claim 1 further comprising:
   recording, by the broadband access server, the detected data flow of the user in step f) in the current element of the circular link list upon determining that the user is not in the IDLE state.

3. A method of claim 1 wherein the inner time interval is 30 seconds and the outer time interval is 5 minutes.

* * * * *